United States Patent
Kampf

(10) Patent No.: US 7,993,205 B2
(45) Date of Patent: Aug. 9, 2011

(54) COUPLING FOR LIMITING THE TORQUE

(75) Inventor: Klaus Kampf, Lohmar (DE)

(73) Assignee: GKN Walterschield GmbH (DE)

( * ) Notice: Subject to any disclaimer, the term of this patent is extended or adjusted under 35 U.S.C. 154(b) by 14 days.

(21) Appl. No.: 12/480,889

(22) Filed: Jun. 9, 2009

(65) Prior Publication Data
US 2009/0318239 A1 Dec. 24, 2009

(30) Foreign Application Priority Data

Jun. 20, 2008 (EP) .................................... 08011227

(51) Int. Cl.
*F16D 7/04* (2006.01)
(52) U.S. Cl. ............................... 464/37; 464/38; 464/39
(58) Field of Classification Search .................... 464/37, 464/38, 39; 192/56.1, 55.1
See application file for complete search history.

(56) References Cited

U.S. PATENT DOCUMENTS

| | | | | |
|---|---|---|---|---|
| 4,261,453 A * | 4/1981 | Kunze | ......................... | 192/56.51 |
| 4,468,206 A | 8/1984 | Herchenbach et al. | | |
| 4,566,570 A * | 1/1986 | Geisthoff | ........................ | 464/37 |
| 4,653,623 A * | 3/1987 | Demorest | ........................ | 464/37 |
| 4,802,326 A * | 2/1989 | Geisthoff | ........................ | 56/10.3 |
| 4,848,547 A * | 7/1989 | Kampf | ........................... | 192/48.6 |
| 5,090,532 A * | 2/1992 | Bich | ............................... | 464/37 |
| 5,342,241 A * | 8/1994 | Kampf | ............................. | 464/37 |
| 5,706,922 A * | 1/1998 | Bondioli | ...................... | 192/56.5 |
| 5,718,634 A * | 2/1998 | Mikeska et al. | ................ | 464/37 |
| 6,174,238 B1 * | 1/2001 | Bondioli | ....................... | 464/37 |
| 6,196,924 B1 * | 3/2001 | Kampf et al. | .................. | 464/37 |
| 6,346,049 B1 * | 2/2002 | Edi | ................................ | 464/38 |
| 6,666,283 B2 * | 12/2003 | Frauhammer et al. | ........ | 173/93.5 |
| 2003/0078106 A1 * | 4/2003 | Carstensen et al. | ............. | 464/37 |
| 2005/0103592 A1 | 5/2005 | Kampf | | |
| 2008/0214313 A1 * | 9/2008 | Jaeger | ............................. | 464/38 |

FOREIGN PATENT DOCUMENTS

| | | |
|---|---|---|
| DE | 30 01 566 | 7/1981 |
| DE | 32 05 513 | 3/1983 |
| DE | 103 48 068 A1 | 5/2005 |
| EP | 0 733 820 | 9/1996 |
| EP | 0 870 945 | 10/1998 |
| EP | 1 072 813 | 1/2001 |

* cited by examiner

*Primary Examiner* — Aaron Dunwoody
(74) *Attorney, Agent, or Firm* — Harness, Dickey & Pierce, P.L.C.

(57) ABSTRACT

A torque limiting coupling (5) in a drive line for driving agricultural implements has a coupling hub (7) and a coupling sleeve (8) that rotatably arranged around the coupling hub (7). The coupling hub (7) and the coupling sleeve (8) are rotatable around a rotational axis D. Drivers (12) are displaceable in the coupling hub (7), respectively, along a driver axis M that is transverse to the rotational axis D. The drivers 12 move between a torque transmitting position and a switched-off position. Recesses (14) are formed in an inner circumferential face (9) of the coupling sleeve (8). The drivers (12) engage the recesses 14 in their torque transmitting position. A setting mechanism (23) acts upon the drivers (12) with a force to urge the drivers 12 to take up their torque transmitting position. The drivers (12) have, respectively, two ratchet faces (19, 21). The recesses (14) have, respectively, two counter ratchet faces (20, 22). When the coupling (5) is switched-off in each rotational direction of the coupling hub (7) relative to the coupling sleeve (8), with a number of relative revolutions in excess of a re-switching-on number of revolutions, one ratchet face (19, 21) and a counter ratchet face (20, 22) interact such, that a displacement of the drivers (12) into the torque transmitting position is prevented.

14 Claims, 6 Drawing Sheets

US 7,993,205 B2

COUPLING FOR LIMITING THE TORQUE

CROSS-REFERENCE TO RELATED APPLICATION

This application claims priority to German Patent Application No. 08011227.9 filed Jun. 20, 2008, which application is herein expressly incorporated by reference.

FIELD

The disclosure relates to a coupling for limiting the torque, especially in a drive line for driving agricultural implements. It comprises a coupling hub and a coupling sleeve that is rotatably arranged around the coupling hub and it has an inner circumferential face. The coupling hub and the coupling sleeve are rotatable around a rotational axis. Drivers are, respectively, displaceable in the coupling hub along a driver axis transverse to the rotational axis. The drivers are displaceable between a torque transmitting position and a switched-off position. Recesses are formed in the inner circumferential face of the coupling sleeve. The drivers engage the recesses in their torque transmitting position. A setting mechanism acts upon the drivers with a force to take-up their torque transmitting position.

BACKGROUND

A coupling is known from DE 103 48 068 A1. The described coupling is effective in one rotational direction. It can switch-off in one rotational direction when a predetermined torque is exceeded. In the other rotational direction, a rigid connection is provided between the coupling hub and the coupling sleeve. Here, the drivers are, respectively, displaceably guided in the coupling hub along a driver axis. The first locking faces are arranged to the respective driver axes, with a larger angle than the second locking faces. Thus, in the first rotational direction, the setting mechanism enables, when a predetermined torque is exceeded, a displacement of the drivers into their switched-off position. The angle between the second locking face and the respective driver axis is so small, that the coupling is not switched-off in the second rotational direction. When viewed in the first rotational direction, chamfers are provided behind the recesses. The coupling, after displacement of the drivers into the switched-off position, switches on again at a predefined re-switching-on number of revolutions. The drivers are acted upon by a force generated by the setting mechanism to take up their torque transmitting position and necessitate for the displacement from the switched-off position into the torque transmitting position a predetermined time span. In the first rotational direction, when the number of revolutions exceeds the re-switching-on number of revolutions, the drivers move outward only when sliding over or passing a recess a small radial distance. Starting from the switched-off position, the drivers, after passing the recess, hit the chamfer. The drivers then slide off the chamfer and are again guided into their switched-off position. When the drivers fall below the re-switching-on number of revolutions, the drivers have enough time to engage deeper into the respective recess. Thus, the respective first locking face comes into abutment with the respective first counter locking face and the drivers cannot be pushed out off the recesses and, thus, engage deeper into the recesses. Thus, it is necessary that for the transition of the inner face to the recess, when seen in the first rotational direction, in front of the recess, that the inner face ends directly in the recess. Also, the chamber is provided behind the recess. Thus, the driver is initially supported on the inner circumferential face of the coupling sleeve. When the driver leaves the inner circumferential face and passed the recess, it can move a radial distance and at a number of revolutions above the re-switching-on number of revolutions gets onto the chamfer.

SUMMARY

The object of the present disclosure is to provide a coupling for limiting torque that is effective in both rotational directions and has corresponding torque limiting functions in both rotational directions.

According to the disclosure, the object is solved by a coupling for limiting torque, especially in a drive line for driving agricultural implements, that has a coupling hub and a coupling sleeve with an inner circumferential face that is rotatably arranged around the coupling hub. The coupling hub and the coupling sleeve are rotatable around a rotational axis. Drivers are, respectively, displaceable in the coupling hub along a driver axis. The drivers are arranged transverse to the rotational axis. The drivers move between a torque transmitting position and a switched-off position. Recesses are formed in the inner circumferential face of the coupling sleeve. The drivers engage the recesses in their torque transmitting position. A setting mechanism acts upon the drivers with a force to take-up their torque transmitting position. The drivers have, respectively, two ratchet faces. The recesses have, respectively, two counter ratchet faces. When the coupling is switched-off in each rotational direction of the coupling hub relative to the coupling sleeve, with a number of relative revolutions above a re-switching-on number of revolutions, a ratchet face and a counter ratchet face interact such that a displacement of the drivers into the torque transmitting position is prevented.

Thus, a surface pairing of a ratchet face on the driver and a counter ratchet face on the recess ensure that in both possible rotational directions, when the coupling is switched off and at a number of relative revolutions above the re-switching-on number of revolutions, a re-switching-on of the coupling is prevented.

The drivers have, respectively, a first locking face and a second locking face. The recesses have, respectively, a first counter locking face and a second counter locking face. In the torque transmitting position of the drivers for torque transmission in a first rotational direction, respectively, the first locking face is supported on the first counter locking face. The second locking face is supported on the second counter face for torque transmission in a second rotational direction.

Thus, defined surface pairings are provided, respectively, of one first locking face and one first counter locking face as well as one second locking face and one second counter locking face. The pairings ensure a torque transmission in both rotational directions.

The drivers have, respectively, a first ratchet face and the recesses have, respectively, a first counter ratchet face. When the coupling is switched-off, the first ratchet face and first counter ratchet face interact in a first rotational direction of the coupling hub relative to the coupling sleeve with a number of relative revolutions in excess of a re-switching-on number of revolutions, such that a displacement of the respective driver into the torque transmitting position is prevented. The drivers have, respectively, a second ratchet face and the recesses have, respectively, a second counter ratchet face. When the coupling is switched-off, the second ratchet face and the second counter face interact in a second rotational direction of the coupling hub relative to the coupling sleeve with a number of relative revolutions in excess of a re-switching-on number of revolutions, such that a displacement of the respective driver into the torque transmitting position is prevented.

Thus, the coupling is formed such that in a ratchet position of the drivers, which is positioned between the torque transmitting position and the switched-off position, in the first rotational direction the respective first ratchet face interacts with the first counter ratchet face of the respective recess. In the second rotational direction, the respective second ratchet face interacts with the second counter ratchet face. This ensures continued slipping of the coupling providing a rotational movement of the coupling hub relative to the coupling sleeve.

Thus, the drivers are in their switched-off position in a position, where they do not engage in the recesses, but are supported outwardly on the inner circumferential face of the coupling sleeve. If the number of relative revolutions between the coupling hub and the coupling sleeve is higher than a predetermined re-switching-on number of revolutions, the drivers pass the recesses in such a short time span, that they cannot engage deeply enough in a recess to enable the locking faces to come into abutment with the counter locking faces. Rather the drivers move only partially into the recesses, wherein the ratchet faces abut the counter ratchet faces. During this, the drivers are in a ratchet position, starting from where, because of the sliding-off of the ratchet faces on the counter ratchet faces, the drivers are pushed back into their switched-off position. A ratchet position can be regarded as any position of the drivers where the drivers only are pushed that deep into the recess, where the ratchet faces come into abutment to the counter ratchet faces.

The first ratchet face and the first locking face of the drivers are arranged at an angle to each other. The second ratchet face and the second locking face of the drivers are also arranged at an angle to each other.

The drivers are displaceably guided in the coupling hub, respectively, along a driver axis. When a driver completely engages in a respective recess and has taken up its torque transmitting position, a center axis, that is arranged on the driver axis, can be defined for each recess.

With respect to the center axis, the first locking face and the first ratchet face of a respective driver are arranged at different angles. Likewise, the second locking face and the second ratchet face of a respective driver are arranged at different angles to the driver axis. In this case, the ratchet faces of a respective driver enclose with the driver axis a larger angle than the locking faces.

The locking faces enclose with the driver axis an angle of 15° to 35°, preferably 20° to 30°. The ratchet faces enclose with the driver axis preferably an angle of 35° to 55°, especially of 40° to 50°.

Furthermore, the ratchet faces of a respective driver are preferably arranged at a larger radial distance to the rotational axis than the locking faces.

Like the ratchet faces and the locking faces, the first counter ratchet faces and the first counter locking faces are arranged at an angle to each other. The second counter ratchet face and the second counter locking face of a respective recess are, respectively, arranged at an angle to each other.

Preferably, the first counter locking face and the first counter ratchet face of a respective recess are arranged at different angles to the center axis. As well, the second counter locking face and the second counter ratchet face of a respective recess are arranged at different angles to the center axis.

In a preferred embodiment, the counter ratchet faces of a recess enclose a larger angle with the center axis than the counter locking faces.

The counter locking faces enclose, preferably, an angle of 15° to 35°, especially of 20° to 30° with the center axis. The counter ratchet faces enclose, preferably, an angle of 35° to 55°, especially of 40° to 50° with the center axis.

The counter ratchet faces of a respective recess are preferably arranged with a smaller radial distance to the rotational axis than the counter locking faces.

In the torque transmitting position of the drivers, the locking faces and the counter locking faces of a respective recess and a driver engage the recess and are arranged parallel to each other. This ensures, in the torque transmitting position of the drivers, respectively, a surface to surface contact between the respective locking faces and the counter locking faces. Thus, in the torque transmitting position of the drivers, the surface pressures are maintained as small as possible.

In order to reduce the surface pressures between the ratchet faces and the counter ratchet faces, they may be arranged parallel to each other.

The setting mechanism is formed such that when a predetermined torque between the coupling hub and the coupling sleeve is exceeded, a displacement of the drivers into their switched-off position is allowed.

The setting mechanism includes at least one setting element. The setting element includes a setting face that acts axially against a counter setting face of at least one driver. It provides a force and urges the at least one driver to take-up its torque transmitting position.

In a preferred embodiment, the setting mechanism includes at least one setting element that, respectively, is urged by a force with one setting face to all drivers.

The setting faces have, respectively, one first setting face portion that is supported on a first counter setting face portion of the counter setting face when the respective driver is in its torque transmitting position.

The setting faces have, respectively, one second setting face portion that is supported on a second counter setting face portion of the counter setting face when the respective driver is in its switched-off position or is in its ratchet position.

In this case, the first counter setting face portion of a respective driver encloses a larger angle with the respective driver axis than the second counter setting face portion.

Thus, this ensures that the drivers can be acted upon with a larger force in the direction towards their torque transmitting position when the drivers are in the torque transmitting position or shortly before the same. When the drivers are in their ratchet position or in their switched-off position, a smaller force acts on the drivers so that the drivers are not strongly pushed outward. This leads to the fact that, on the one hand, the drivers are pushed slower into the recesses. Thus, this ensures that at relative small numbers of relative revolutions, the coupling functions as a ratchet and does not switch on again. On the other hand, especially in the ratchet position of the drivers, wear is reduced. The ratchet faces act upon each other with a smaller force of the setting mechanism and when the ratchet faces strike onto the counter ratchet faces, smaller forces are active.

To reduce the surface pressures at the setting faces and the counter setting faces, in the torque transmitting position of the drivers, respectively, the first setting face portion is arranged parallel to the first counter setting face portion. In the switched-off position of the drivers, respectively, the second setting face portion is arranged parallel to the second counter setting face portion.

Generally different coupling types may be provided. Thus, setting elements may be provided that, respectively, act on several drivers, simultaneously. They may be in the form of a setting ring. The setting ring, in axial direction concerning the rotational axis, provides a force onto the drivers. In this case, the drivers on the side facing away from the setting ring may be supported on a setting face. It is, furthermore, possible, that the drivers may be acted upon with a force at both sides by two setting rings.

An alternative possibility for the force impingement of the drivers may be seen in that, respectively, each driver is acted upon by a force from a setting element. In this case, the setting elements may be arranged parallel to the longitudinal axis displaceable in the coupling hub or, preferably, transversally to the rotational axis, wherein the setting axes of the setting elements intersect the rotational axis at a distance.

Further areas of applicability will become apparent from the description provided herein. The description and specific examples in this summary are intended for purposes of illustration only and are not intended to limit the scope of the present disclosure.

DRAWINGS

Preferred embodiments of the disclosure are described in detail in the following using the drawings.

DETAILED DESCRIPTION

Figure 1:
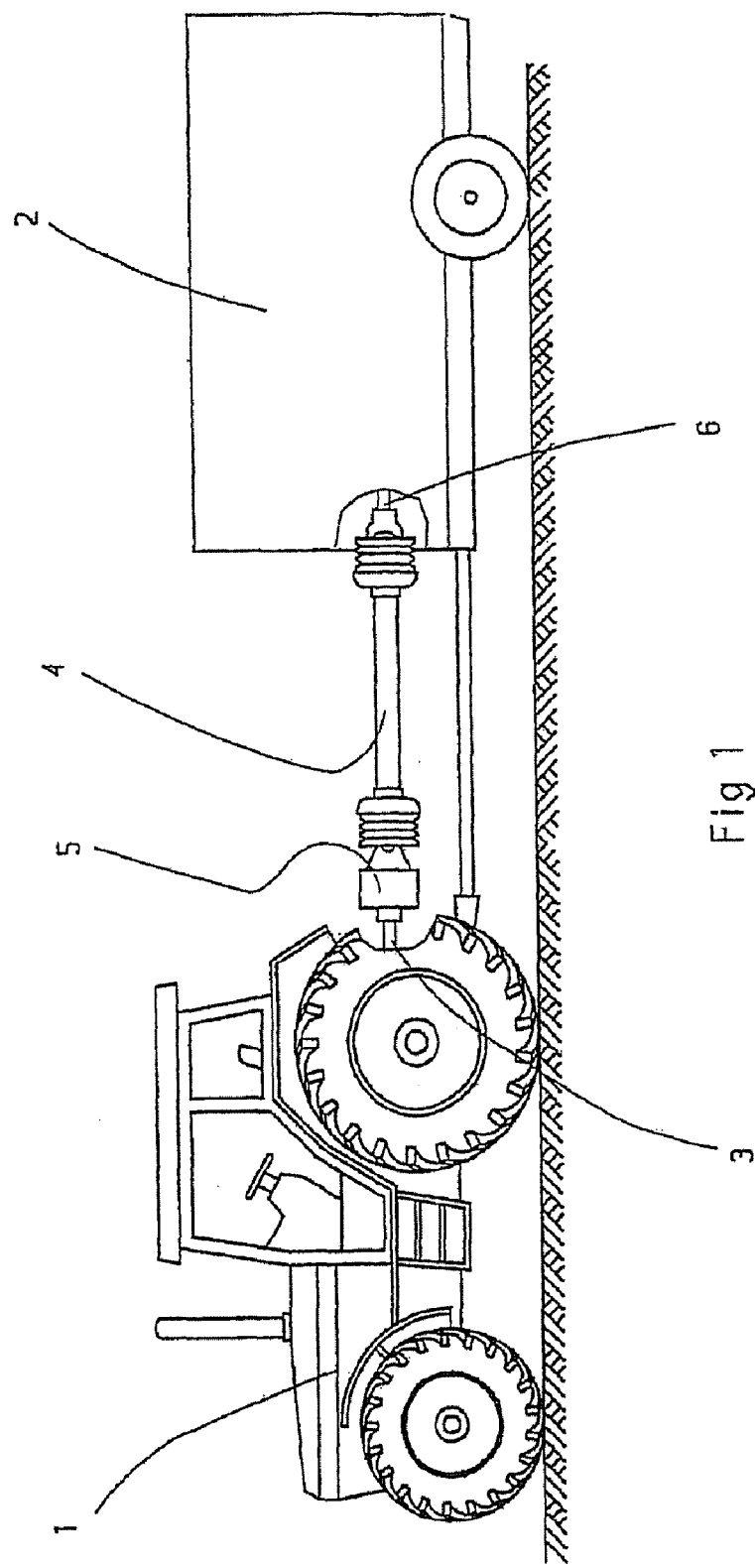
FIG. 1 is an elevation view of a tractor with an attached implement that is driven by an interconnection of a coupling according to the disclosure.

In FIG. 1, a tractor 1 with an attached implement 2 is visible. A power take-off shaft 3 of the tractor 1 serves to drive, via a propeller shaft 4, working tools of the implement 2. The working tools are not shown. The propeller shaft 4 has a coupling 5 according to the present disclosure. The coupling 5 is arranged towards the power take-off shaft 3. The propeller shaft 4 is connected inside of the implement to a drive shaft 6 of the implement 2. The coupling 5 serves, in case of an overload on the implement 2, to interrupt the drive. Thus, the power take-off shaft 4 can further rotate without torque being transmitted to the propeller shaft 4. The structure of the coupling 5 and its function is described in detail using the following Figures.

Figure 5:
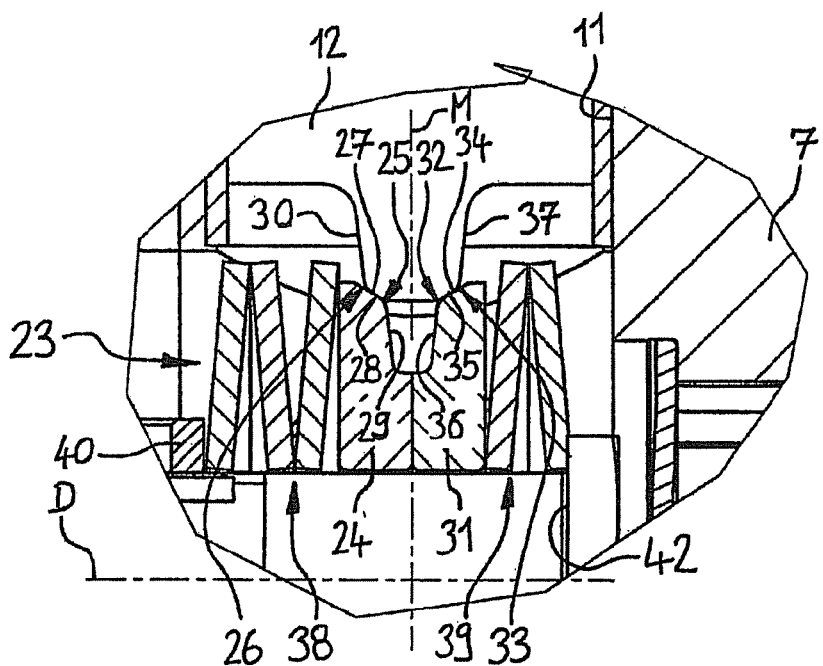
FIG. 5 is an enlarged longitudinal sectional view of the detail V of FIG. 3 of the setting mechanism.
Figure 6:
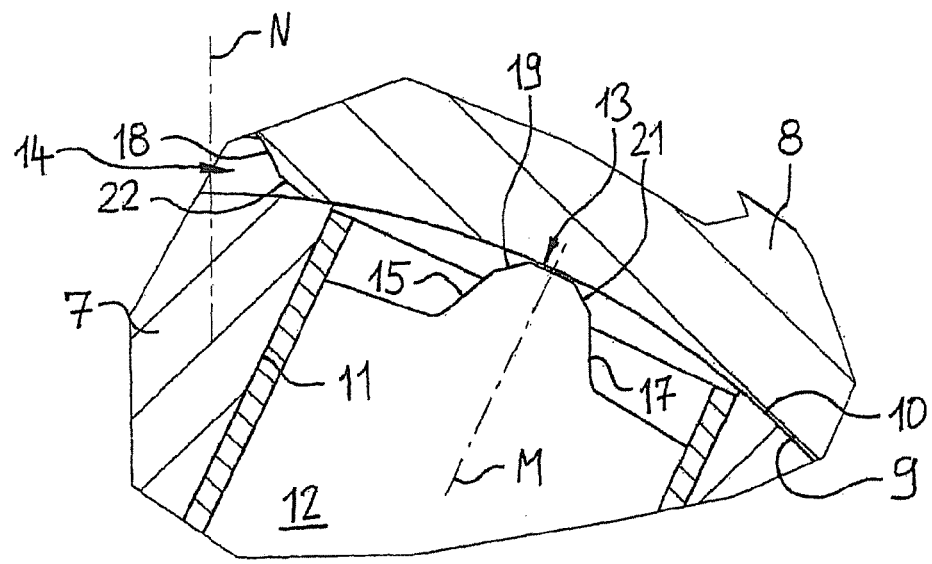
FIG. 6 is an enlarged cross-section of FIG. 4 with the driver in its switched-off position.
Figure 7:
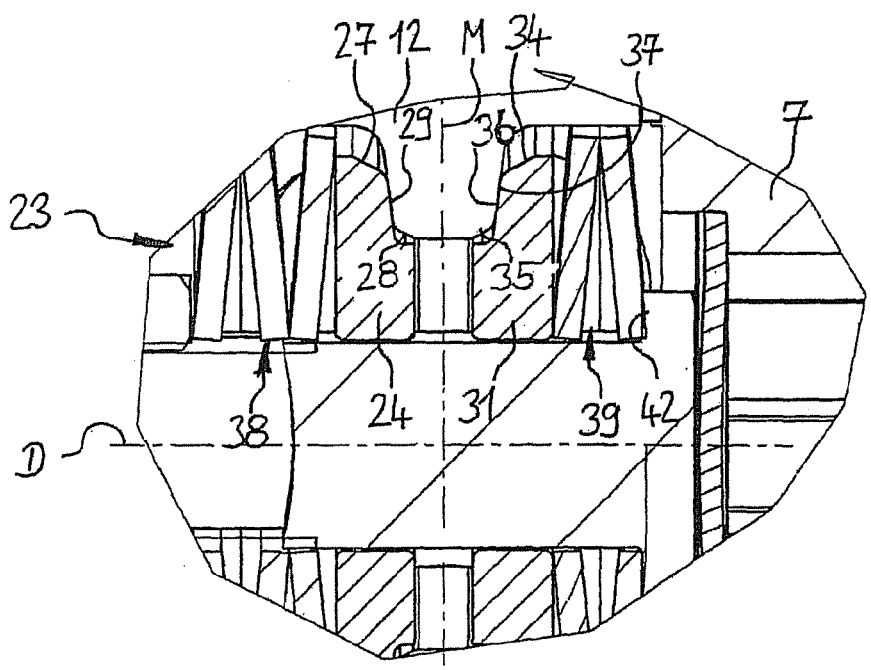
FIG. 7 is an enlarged longitudinal sectional view of FIG. 5 with the driver in its switched-off position.

FIGS. 2 to 5 illustrates a coupling 5 according to the disclosure with drivers 12 in a torque transmitting position. FIGS. 6 and 7 illustrate the drivers 12 in a switched-off position and FIGS. 8 and 9 in a ratchet position. The Figures are described together in the following paragraphs.

The coupling 5 includes a coupling hub 7 and a coupling sleeve 8 that is rotatably arranged around the hub. Both components, the coupling hub 7 as well as the coupling sleeve 8, are rotatable around a central rotational axis D. The coupling sleeve 8 has an inner circumferential face 9 that rotatably supports the coupling sleeve 8 on an outer circumferential face 10 of the coupling hub 7. Also, different bearing members are possible, so that the inner circumferential face 9 and the outer circumferential face 10 may be arranged distanced from each other.

In the coupling hub 7, four radial bores 11 are provided. Drivers 12 are radially displaceably guided in the bores 11 along a driver axis M between a torque transmitting position, shown in FIG. 4, and a switched-off position, shown in FIG. 6. Each driver axis is independent of the other driver axes so that each driver is displaced along a different axis. In the present case four radial bores 11 are shown with, respectively, one driver 12. However, a different numbers of drivers and radial bores may be provided. In the following, the drivers are described exemplary by means of one of the drivers 12.

Figure 2:
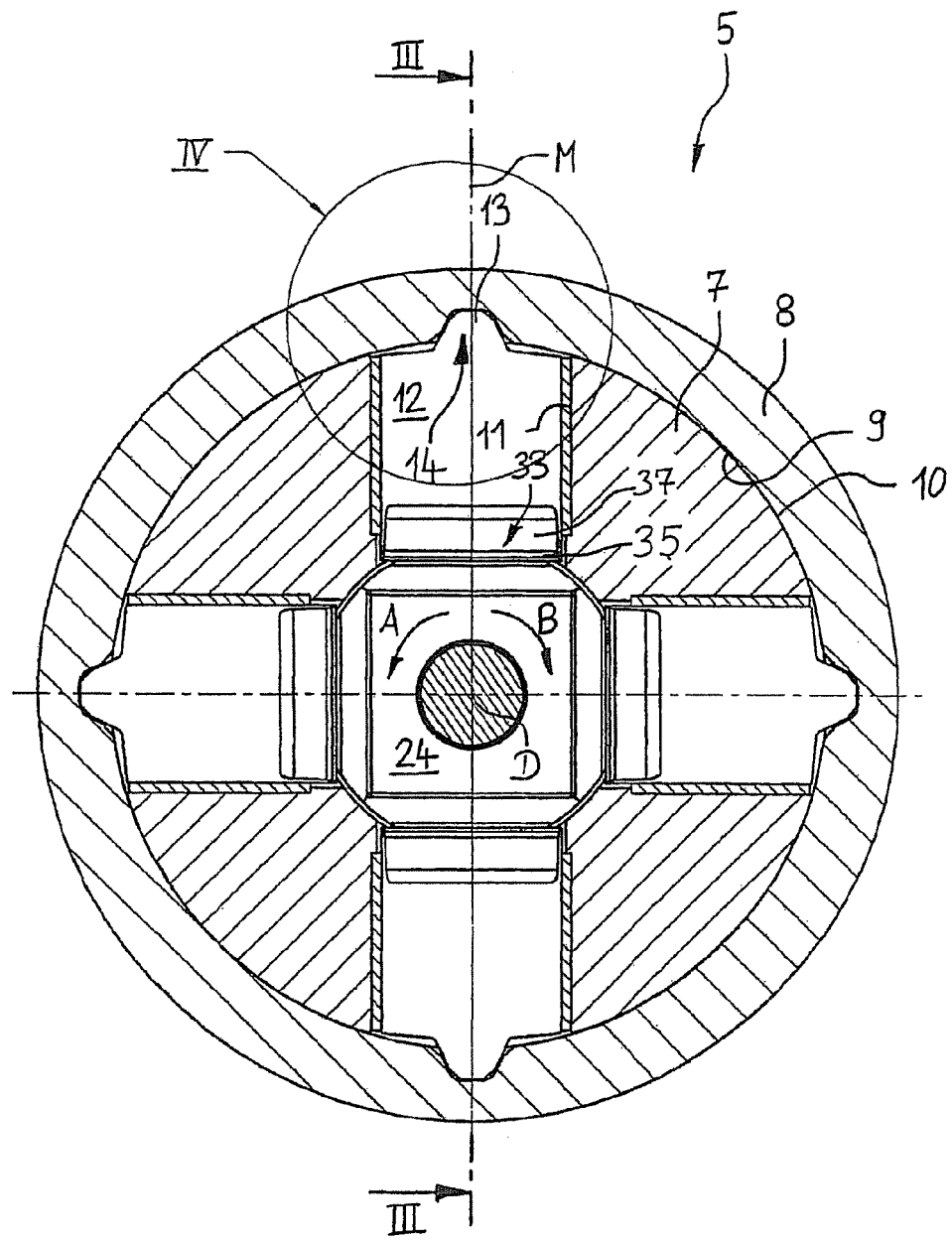
FIG. 2 is a cross-section view through a coupling in the torque transmission position.
Figure 3:
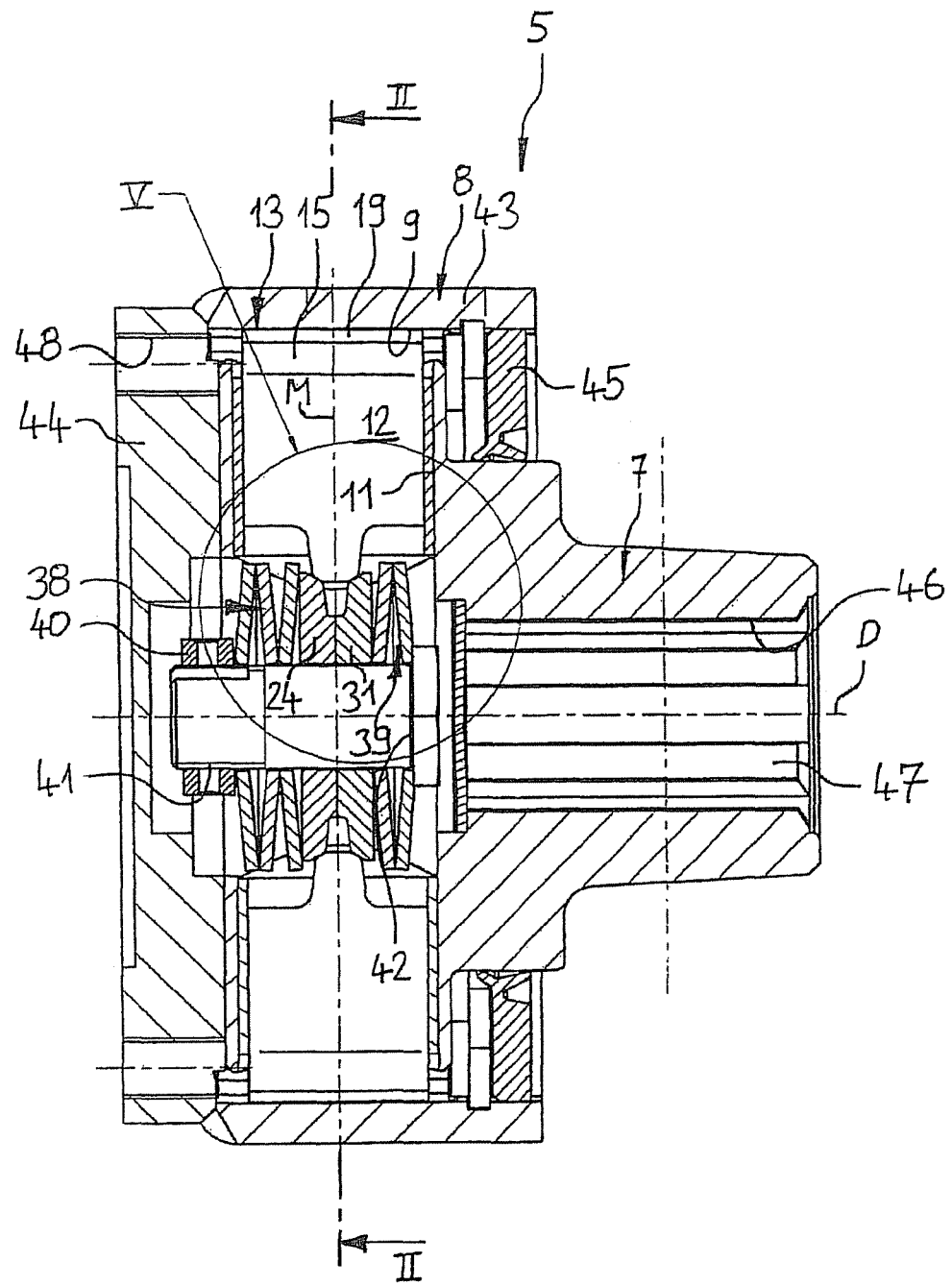
FIG. 3 is a longitudinal sectional view of the coupling of FIG. 2 along the line III-III.
Figure 4:
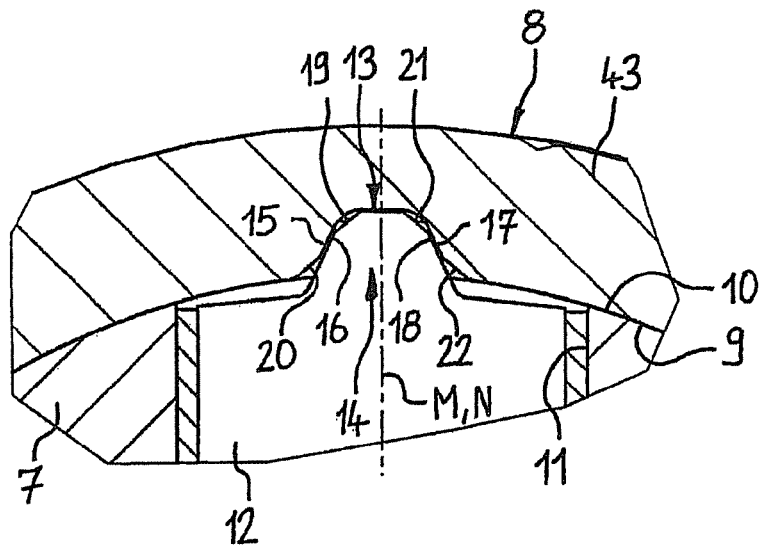
FIG. 4 is an enlarged cross-section view of the detail IV of FIG. 2 of a head portion of a driver.

In the torque transmitting position, shown in FIG. 2, the drivers 12 include head portions 13 that engage in recesses 14. The recesses 14 are provided in the inner circumferential face 9 of the coupling sleeve 8. The recesses 14, in the form of grooves, are arranged parallel to the rotational axis D of the coupling 5. In order to transmit, torque between the coupling hub 7 and the coupling sleeve 8 in a first rotational direction A, the drivers 12 include a first locking face 15 on the head portion 13. The first locking face 15 is supported, in the torque transmitting position of the driver 12, on a first counter locking face 16 in the circumferential direction. Thus, torque can be transmitted from the coupling hub 7, via the drivers 12, onto the coupling sleeve 8. In the torque transmitting position, the first locking face 15 and the first counter locking face 16 are arranged parallel to each other. Thus, they abut each other flush, to form a surface contact. The first locking face 15 and the first counter locking face 16 enclose an angle with the driver axis M. The angle opens inwardly towards the rotational axis D. During torque transmission between the coupling hub 7 and the coupling sleeve 8, a force component results in the normal direction concerning the first counter locking face 16 and a force component in the plane of the first counter locking face 16. When a predetermined limiting torque is exceeded, the drivers are urged, because of the angle or incline of the first locking face 15 and the first counter locking face 16, radially inwards out of the recesses 15, until they have reached their switched-off position, shown in FIG. 6.

For torque transmission between the coupling hub 7 and the coupling sleeve 8 in a second rotational direction B, the drivers 12 include a second locking face 17 on the head portion 13. The second locking face 17 in the torque transmitting position of the drivers 12 abuts a second counter locking face 18 of the recess 14. In this case, the second locking face 17 and the second counter locking face 18 are arranged parallel to each other so that a surface contact is achieved. The second locking face 17 and the second counter locking face 18 enclose or define an angle with the driver axis M. This angle opens inwardly towards the rotational axis D. In the present case, the second locking face 17 and the second counter locking face 18 enclose an angle with the driver axis that is as large as the angle that is enclosed by the first locking face 15 and the first counter locking face 16 with driver axis M. Generally, however, different large angles are possible. Thus, also in the second torque transmission direction B, it is possible that, when exceeding a predetermined limiting torque, the driver 12 is pushed radially inwardly out of the recess 14 until it reaches its switched-off position.

In the switched-off position, shown in FIG. 6, the drivers 12 are completely arranged within the coupling sleeve 8 or within the inner circumferential face 9 of the coupling sleeve 8. The drivers 12, as described below, are acted upon by a force to take-up their torque transmitting position. Thus, the drivers 12 are supported with their head portions 13 on the inner circumferential face 9 of the coupling sleeve 8.

Figure 8:
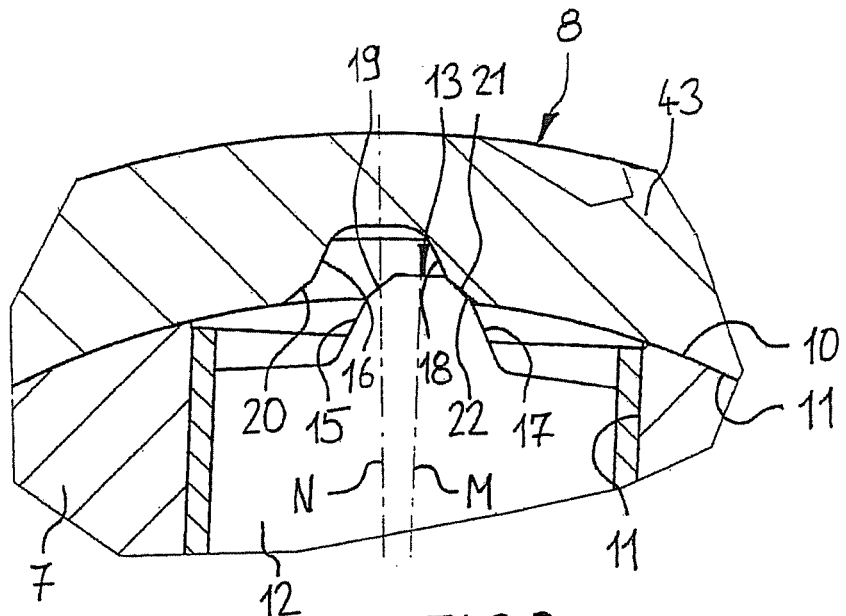
FIG. 8 is an enlarged cross-section view of FIG. 4 with the driver in its ratchet position.
Figure 9:
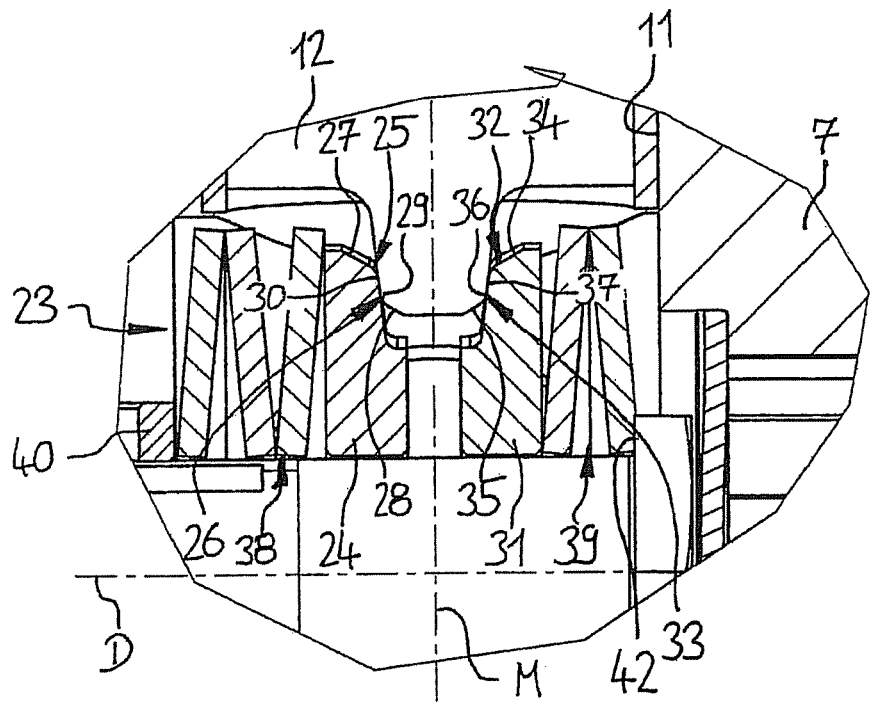
FIG. 9 is an enlarged longitudinal sectional view of FIG. 5 with the driver in its ratchet position.

In the switched-off position, the drivers 12 do not engage the recesses 14 anymore. Thus, the coupling hub 7 can freely rotate within the coupling sleeve 8. During rotation, when passing a recess 14, the drivers 12 are pushed back into the recesses 14, as they are acted upon by a outward force. To ensure that the drivers 12, at a number of relative revolutions of the coupling hub 7 to the coupling sleeve 8 in excess of a re-switching-on number of revolutions, cannot completely engage in the recesses 14, the head portions 13 include a first ratchet face 19. Thus, the head portions are pushed out of the recesses 14. In a ratcheted position of the drivers 12, as shown in FIG. 8, the head portion 13 and first ratchet face 19 is in abutment with a first counter ratchet face 20 of the recess 14. In the ratchet position of the drivers 12, the drivers 12 are in a position between the torque transmitting position and the switched-off position. In this case, each position of one of the drivers 12 can be described as a ratchet position where the first ratchet face 19 abuts the first counter ratchet face 20. The first ratchet face 19 is arranged on the head portion 13 further radially outside than the first locking face 15. In the present case, the first ratchet face 19 radially follows the first locking face 15 and is arranged at the free end of the head portion 13. The first ratchet face 19 and the first counter ratchet face 20 are arranged such that a surface to surface contact is achieved between them when they abut each other. The first ratchet face 19 defines an angle with the driver axis M that opens towards the rotational axis D. The first counter ratchet face 20 encloses an angle with a center axis N. The center axis N is arranged on the driver axis M of a driver 12 engaging the recess 14. The angle between the first ratchet face 19 and the driver axis M and the first counter ratchet face 20 and the center axis N is larger than the angle that the first locking face 15 and the first counter locking face 16 enclose with the driver axis M of a driver 12 engaging the recess 14.

Because of the larger angle between the first ratchet face 19 and the driver axis M or of the first counter ratchet face 20 and the center axis N it is ensured, that the drivers 12, when the first ratchet face 19 and the first counter ratchet face 20 contact each other, are pushed more strongly inwards. Thus, the drivers 20 are again displaced into their switched-off position. Only when the number of relative revolutions between the coupling hub 7 and the coupling sleeve 8 exceeds a re-switching-on number of revolutions, do the drivers 12 have enough time, when passing a recess 14, to engage deeper into the recesses. Thus, first ratchet face 19 does not abut the first counter ratchet face 20, but the first locking face 15 abuts the first counter locking face 16. Because of the smaller angle between the first locking face 15 and the driver axis M or of the first counter locking face 16 and the driver axis M, the drivers 12 are not that strongly loaded inwardly by the coupling sleeve 8. Thus, the force with which the drivers are acted upon towards their torque transmitting position is sufficient to displace the drivers 12 into the torque transmitting position.

The drivers 12 have, respectively, a second ratchet face 21 that in a ratchet position of the drivers 12 can contact a second counter ratchet face 22 of the recesses 14. Thus, the second ratchet face 21 abuts the second counter ratchet face 22 to ensure, in a second rotational direction B of the coupling hub 7 relative to the coupling sleeve 8, that the drivers 12 can be displaced from their ratchet position into their switched-off position. The second ratchet face 21 encloses a larger angle with the driver axis M than the second locking face 17. Also the second counter ratchet face 22 encloses a larger angle with the center axis N than the second counter locking face 18. The second ratchet face 21 and the second counter ratchet face 22 achieve a surface to surface contact with each other. In this case, the angles can be as large as those between the first ratchet face 19 or the first counter ratchet face 20 and the driver axis M.

The coupling 5 has a setting mechanism applying a force 23 to act upon the drivers 12 in a direction towards their torque transmitting position. The setting mechanism 23 is shown in FIG. 5 with a driver 12 in the torque transmitting position. The setting mechanism 23 includes a first setting element in the form of a first setting ring 24. It is acted upon by a force with a first setting faces 25 in abutment with the first counter setting faces 26 of the driver 12. In the driver 12 torque transmitting position, shown in FIG. 5, the first setting face portion 27 of each first setting face 25 is in abutment with a first counter setting face portion 28 of the first counter setting faces 26. In the switched-off position of the drivers 12, shown in FIG. 7, the second setting face portions 29 abut the second counter setting face portions 30 of the first counter setting faces 26. The first setting face portions 27 are, respectively, arranged on a plane that encloses an angle with the rotational axis D. The angle opens in the direction towards the first setting ring 24. Likewise, the second setting face portions 29 are arranged on planes that enclose an angle with the rotational axis D. The angle opens towards the first setting ring 24. This angle is smaller than the angle that is enclosed by the planes of the first setting face portions 28 and the rotational axis D.

The first setting face portions 27 and the first counter setting face portions 28 are arranged with respect to each other such that a surface to surface contact is achieved between them. Likewise, the second setting face portions 29 and the second counter setting faces 30 are arranged with respect to each other such that a surface to surface contact is achieved.

This arrangement of the first setting ring 24 and the drivers 12 ensures that by force loading the first setting ring 24 in the direction towards the drivers 12, the drivers 12 are acted upon in the direction towards the torque transmitting position. Due to the different angular arrangement of the first setting face portions 27 and the second setting face portions 29, the force that acts upon the drivers 12 in the direction towards the torque transmitting position, gets smaller, starting from the switched-off position, and gets larger in the direction towards the torque transmitting position. Thus, after the switching-off of the coupling because of exceeding a limiting torque, it is ensured that the torque for re-switching-on is considerably smaller than the limiting torque. Thus, an automatic switching-on of the coupling is only possible at smaller torques considerably below the limiting torque.

The second setting face portions 29 abut the second counter setting face portions 30 not only in the switched-off position of the drivers but also in the ratchet position of the drivers 12. Thus, this ensures that the drivers are forced into their ratchet position with a lower outward force than in the torque transmitting position. Thus, the forces that are active between the drivers 12 and the coupling sleeve 8 or between the ratchet faces 19, 21 and the counter ratchet faces 20, 22, are smaller, to minimize wear. Furthermore, it is ensured that the drivers 12 are securely held in the recesses 14 in the torque transmitting position.

On the side of the drivers 12 that face away from the first setting ring 24, a second setting element is provided in the form of a second setting ring 31. The second setting ring 31 has second setting faces 32 that are, respectively, acted upon by a force against second counter setting faces 33 of the drivers 12. The second setting faces 32 have, as the first setting faces 25, first setting face portions 34. In the torque transmitting position of the drivers 12, the first setting face portions 34 abut, with a surface to surface contact, the first counter setting face portions 35 of the second counter setting faces 32. Furthermore, the second setting faces 32 have second setting face portions 36. In the switched-off position of the drivers 12 and in the ratchet position of the drivers 12, the second setting face portions 36 are held in surface to surface contact with the second counter setting face portions 37 of the second counter faces 26.

The first setting ring 24 is acted on by a force from a first spring disc assembly 38 in the direction towards the drivers 12. The second setting ring 31 is acted on by a force from a second spring disc assembly 39 in the direction towards the drivers 12. The first spring disc assembly 38 is axially supported on the first setting ring 24 and on a nut 40, wherein the nut 40 is screwed onto an external thread 41 of the coupling hub 7. The second disc spring assembly 39 is axially supported on the second setting ring 31 and on a shoulder face 42 of the coupling hub 7. The nut 40 is screwed onto an external thread 41 of the coupling hub 7. Adjusting the nut 40 on the external thread 41, adjusts the bias force that acts upon the setting rings 24, 31 and, thus, the drivers 12.

The coupling sleeve 8 includes a housing 43 as well as a lid 44 that are welded to each other. A sealing ring 45 is provided to seal the inner chamber of the coupling 5. The sealing ring 45 is provided between the housing 43 and the coupling hub 7. The coupling hub 7 has a central axial bore 46 with longitudinal splines 47 to connect the coupling hub 7 to a component of a drive line. The splines provide a non-rotational connection to a shaft stub. The lid 44 can be connected, via threaded bores 48, which are provided in the lid 44, to a further component of a drive line.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A coupling for limiting torque in a drive line for driving agricultural implements comprising:
    a coupling hub;
    a coupling sleeve rotatably arranged around the coupling hub, said coupling sleeve has an inner circumferential face and the coupling hub and the coupling sleeve are rotatable around a rotational axis;
    a plurality of drivers, each driver displaceable in the coupling hub along a respective independent driver axis arranged transversally to the rotational axis, the drivers are displaceable between a torque transmitting position and a switched-off position, the drivers further have a first locking face and a second locking face;
    recesses are in the inner circumferential face of the coupling sleeve, the drivers engage the recesses in their torque transmitting position, and the recesses have a first counter locking face and a second counter locking face wherein, in the torque transmitting position of the drivers, for the torque transmission in a first rotational direction, the first locking face is supported on the first counter locking face and for torque transmission in a second rotational direction, the second locking face is supported on the second counter face;
    a setting mechanism acts upon the drivers with a force to enable the drivers to take-up their torque transmitting position;
    wherein each driver has two ratchet faces and each recess has two counter ratchet faces, when the coupling is switched-off in each rotational direction of the coupling hub relative to the coupling sleeve, with a number of relative revolutions in excess of a re-switching-on number of revolutions, a ratchet face and a counter ratchet face interact such that a displacement of the drivers into the torque transmitting position is prevented;
    wherein the ratchet faces of a respective driver is arranged with a larger radial distance to the rotational axis than the locking faces;
    wherein the ratchet faces enclose an angle of 35° to 55° with the center axis; and
    wherein the counter ratchet faces enclose an angle of 35° to 55° with the center axis of the respective recess.

2. The coupling according to claim 1, wherein the drivers have a first ratchet face and the recesses have a first counter ratchet face, when the coupling is switched-off, the first ratchet face and the first counter ratchet face interact in a first rotational direction of the coupling hub relative to the coupling sleeve with a number of relative revolutions in excess of a re-switching-on number of revolutions, such that a displacement of the respective driver into the torque transmitting position is prevented, and the drivers have a second ratchet face and the recesses have a second counter ratchet face, when the coupling is switched-off, the second ratchet face and the second counter ratchet face interact in a second rotational direction of the coupling hub relative to the coupling sleeve with a number of relative revolutions in excess of a re-switching-on number of revolutions, such that a displacement of the respective driver into the torque transmitting position is prevented.

3. The coupling according to claim 2, wherein in a ratchet position of the drivers, which is positioned between the torque transmitting position and the switching-off position, in the first rotational direction the respective first ratchet face abuts the first counter ratchet face of the respective recess and in the second rotational direction the respective second ratchet face abuts the second counter ratchet face.

4. The coupling according to claim 2, wherein the first ratchet face and the first locking face of the drivers are, respectively, arranged at an angle to each other, and that the second ratchet face and the second locking face of the drivers are, respectively, arranged at an angle to each other.

5. The coupling according to claim 2, wherein the first locking face and the first ratchet face of a respective driver are arranged at different angles to the respective driver axis and the second locking face and the second ratchet face of a respective driver are arranged at different angles to the respective driver axis.

6. The coupling according to claim 1, wherein the ratchet faces of a respective driver enclose a larger angle with the driver axis than the locking faces.

7. The coupling according to claim 1, wherein the locking faces and the counter locking faces are formed such that in the torque transmitting position of the drivers, respectively, one of the locking faces is arranged in surface to surface contact with one of the counter locking faces.

8. The coupling according to claim 1, wherein the ratchet faces and the counter ratchet faces are formed such that one of the ratchet faces comes into surface to surface contact with one of the counter ratchet faces.

9. The coupling according to claim 1, wherein the setting mechanism further comprises at least one setting element with a setting face that acts axially on a counter setting face of at least one driver with a force and urges the at least one driver to take-up its torque transmitting position.

10. The coupling according to claim 9, wherein the setting mechanism further comprises at least one setting element with one setting face that acts on all drivers with a force.

11. The coupling according to claim 9, wherein the setting faces have one first setting face portion that is supported on a first counter setting face portion of the counter setting face when the respective driver is in its torque transmitting position.

12. The coupling according to claim 11, wherein the setting faces have one second setting face portion that is supported on a second counter setting face portion of the counter setting face, when the respective driver is in its switched-off position or in its ratchet position.

13. The coupling according to claim 12, wherein the first counter setting face portion of one driver encloses a larger angle with the respective driver axis than the second counter setting face portion.

14. A coupling for limiting torque in a drive line for driving agricultural implements comprising:
  a coupling hub;
  a coupling sleeve rotatably arranged around the coupling hub, said coupling sleeve has an inner circumferential face and the coupling hub and the coupling sleeve are rotatable around a rotational axis;
  a plurality of drivers, each driver displaceable in the coupling hub along a respective independent driver axis arranged transversally to the rotational axis, the drivers are displaceable between a torque transmitting position and a switched-off position, the drivers further have a first locking face and a second locking face;
  recesses are in the inner circumferential face of the coupling sleeve, the drivers engage the recesses in their torque transmitting position, and the recesses have a first counter locking face and a second counter locking face wherein, in the torque transmitting position of the drivers, for the torque transmission in a first rotational direction, the first locking face is supported on the first counter locking face and for torque transmission in a second rotational direction, the second locking face is supported on the second counter face;
  a setting mechanism acts upon the drivers with a force to enable the drivers to take-up their torque transmitting position;
  each driver has two ratchet faces and each recess has two counter ratchet faces, when the coupling is switched-off in each rotational direction of the coupling hub relative to the coupling sleeve, with a number of relative revolutions in excess of a re-switching-on number of revolutions, a ratchet face and a counter ratchet face interact such that a displacement of the drivers into the torque transmitting position is prevented;
  the ratchet faces of a respective driver is arranged with a larger radial distance to the rotational axis than the locking faces; and
  at least the ratchet faces or counter ratchet faces enclose an angle of 35° to 55° with a respective center axis.

\* \* \* \* \*

UNITED STATES PATENT AND TRADEMARK OFFICE
CERTIFICATE OF CORRECTION

PATENT NO. : 7,993,205 B2  
APPLICATION NO. : 12/480889  
DATED : August 9, 2011  
INVENTOR(S) : Klaus Kampf Title Page (73) Assignee,
"GKN Walterschield GmbH" should be --GKN Walterscheid GmbH--

Signed and Sealed this
Twentieth Day of March, 2012

David J. Kappos
*Director of the United States Patent and Trademark Office*